United States Patent
Honma

(10) Patent No.: US 7,692,690 B2
(45) Date of Patent: Apr. 6, 2010

(54) IMAGE SENSING APPARATUS FOR RECORDING A MOVING IMAGE AND A STILL IMAGE AND ITS CONTROL METHOD

(75) Inventor: Yoshihiro Honma, Asaki (JP)

(73) Assignee: Canon Kabushiki Kaisha, Tokyo (JP)

(*) Notice: Subject to any disclaimer, the term of this patent is extended or adjusted under 35 U.S.C. 154(b) by 465 days.

(21) Appl. No.: 11/406,256

(22) Filed: Apr. 19, 2006

(65) Prior Publication Data
US 2006/0256203 A1 Nov. 16, 2006

(30) Foreign Application Priority Data
May 11, 2005 (JP) ............... 2005-138730
Mar. 15, 2006 (JP) ............... 2006-071496

(51) Int. Cl.
*H04N 5/225* (2006.01)
(52) U.S. Cl. .................................. 348/220.1
(58) Field of Classification Search .............. 348/220.1, 348/207.99, 221.1
See application file for complete search history.

(56) References Cited

U.S. PATENT DOCUMENTS

| | | | |
|---|---|---|---|
| 4,660,102 A * | 4/1987 | Kawakami et al. | 386/64 |
| 6,243,531 B1 * | 6/2001 | Takeuchi et al. | 386/108 |
| 7,236,194 B2 * | 6/2007 | Kawakubo | 348/272 |
| 7,324,136 B2 * | 1/2008 | Kubo | 348/220.1 |
| 7,453,495 B2 * | 11/2008 | Kuroiwa | 348/220.1 |
| 2002/0021361 A1 * | 2/2002 | Kitajima et al. | 348/232 |
| 2002/0196348 A1 * | 12/2002 | Kubo | 348/220.1 |
| 2003/0095191 A1 * | 5/2003 | Saito | 348/220.1 |
| 2004/0109067 A1 * | 6/2004 | Yokoi | 348/220.1 |
| 2005/0140797 A1 * | 6/2005 | Moon | 348/231.99 |
| 2005/0157177 A1 * | 7/2005 | Fukushima et al. | 348/207.99 |
| 2008/0112689 A1 * | 5/2008 | Yokoi | 386/117 |

FOREIGN PATENT DOCUMENTS

| | | | |
|---|---|---|---|
| JP | 63156480 A | * | 6/1988 |
| JP | 2003-008948 | | 1/2003 |
| JP | 2004-201282 | | 7/2004 |

* cited by examiner

*Primary Examiner*—David L Ometz
*Assistant Examiner*—Richard M Bemben
(74) *Attorney, Agent, or Firm*—Fitzpatrick, Cella, Harper & Scinto

(57) ABSTRACT

This invention provides a technique which performs moving image recording and still image recording free from unnatural feeling by positively informing the user of the fact that a still image is sensed during playback of a moving image when a still image is sensed during moving image recording. To this end, when a release switch is pressed to its full stroke position during moving image recording, and a switch SW2 is turned on, a still image is sensed. This still image sensing processing period is divided into a first period and second period. In the first period, a blackout image is generated, and is recorded as a moving image of a first substitute frame period (S432). An image of the sensed still image is recorded as a moving image of a second substitute frame period in the second period.

16 Claims, 4 Drawing Sheets

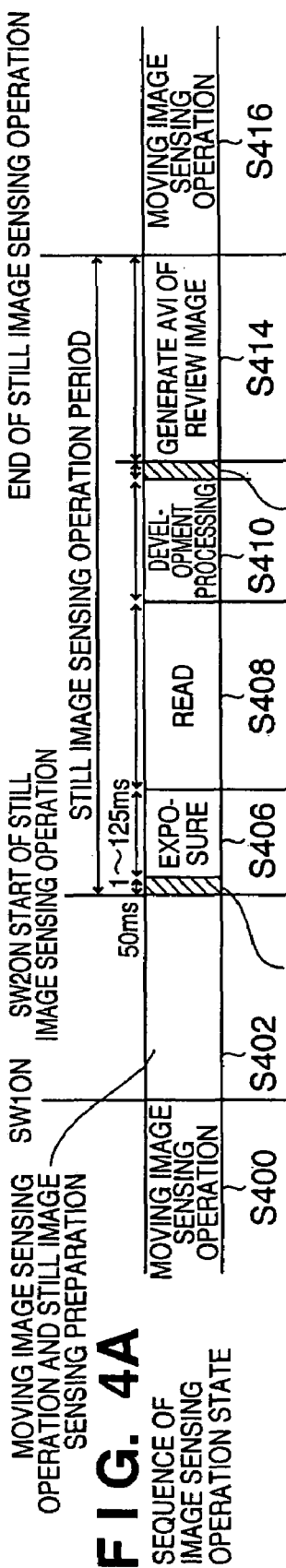
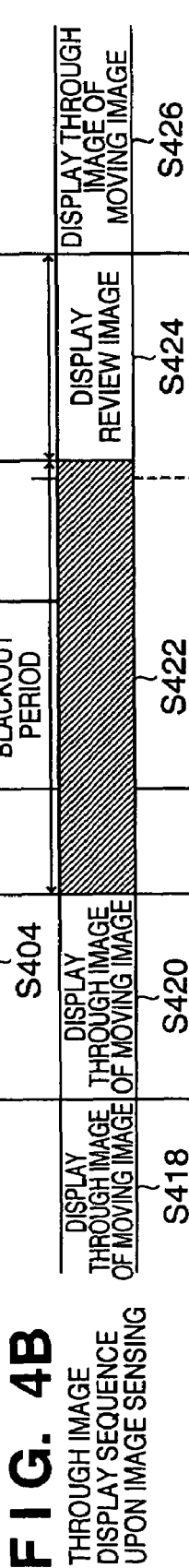
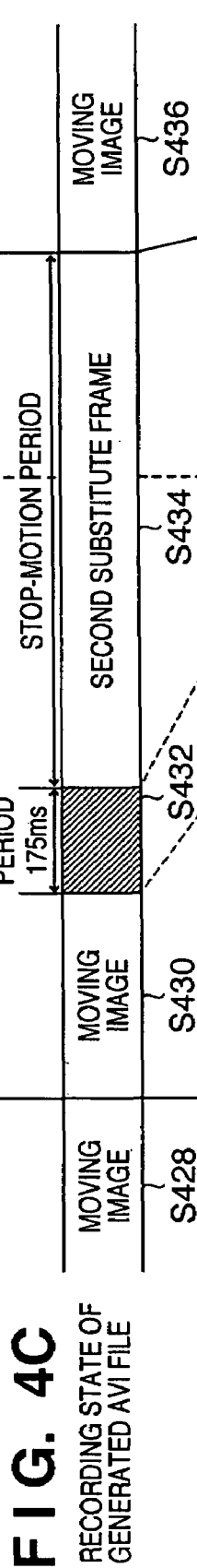
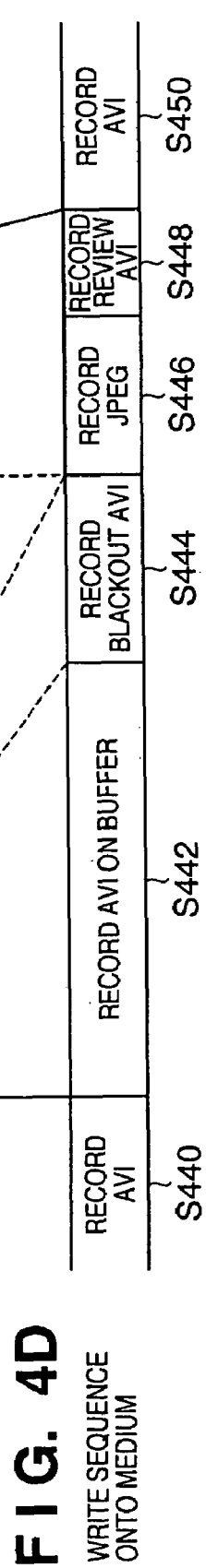

IMAGE SENSING APPARATUS FOR RECORDING A MOVING IMAGE AND A STILL IMAGE AND ITS CONTROL METHOD

FIELD OF THE INVENTION

The present invention relates to an image sensing method and its control method.

BACKGROUND OF THE INVENTION

Conventionally, digital cameras, each of which converts an image signal sensed by an image sensing element such as a CCD or the like into a digital signal, processes that digital signal to obtain a digital video signal including luminance and color difference signal components, applies compression processing such as JPEG to the digital video signal, and records the compressed signal on a recording medium, have been developed. The resolution of an image sensing element in such digital camera is increasing, and some elements have several million pixels and more than ten-million pixels.

Meanwhile, many cameras have a function of recording a moving image by reading signals at high speed from the image sensing element while skipping horizontal and vertical lines and the like. More specifically, recent digital cameras have a still image sensing mode for performing still image sensing processing described above, and a moving image sensing mode for performing moving image sensing processing, and these image sensing modes are switched by a user's operation.

In recent years, it has become possible to sense still images during moving image recording (Japanese Patent Laid-Open No. 2004-201282). A technique according to this reference describes a method of solving a problem that a moving image compressed data file is divided into two files to have a still image between them in moving image sensing interrupted by still image sensing when a still image is sensed during moving image recording. More specifically, one frame immediately before a still image sensing period is used as a substitute frame, which is continuously stored in a moving image file only during the still image sensing period, thus preventing a moving image file from being divided. Furthermore, this reference also discloses a technique for synchronizing the start timing required to restart moving image sensing processing by image sensing means after completion of still image sensing to a moving image frame sensing period in moving image sensing processing before the moving image sensing processing is interrupted.

Also, a technique using special image data or non-image frame as a substitute frame which substitutes an omitted moving image frame is known (Japanese Patent Laid-Open No. 2003-8948).

However, in the aforementioned prior art, as for display of a non-image frame (blackout image) or a substitute frame (stop-motion image) immediately before and after a moving image or from a still image, a substitute frame is inserted so as not to interrupt the moving image display. A moving image which has motion when it is sensed actually is unnaturally displayed during the still image sensing period. That is, when a sensed moving image is played back, an awkward moving image is displayed during the still image sensing period in a moving image unlike normal moving image display, thus making the user feel unnatural.

SUMMARY OF THE INVENTION

The present invention has been made to solve the aforementioned problems, and has as its object to provide a technique which performs moving image recording and still image recording free from unnatural feeling by positively informing the user of the fact that a still image is sensed during playback of a moving image when a still image is sensed during moving image recording.

To achieve this object, an image sensing apparatus of the present invention comprises the following arrangement. That is, there is provided an image sensing apparatus which comprises image sensing means and records image data sensed by the image sensing means in a recording medium, characterized by comprising:

image sensing operation control means for controlling a moving image sensing operation for recording a moving image obtained by continuously sensing an image by the image sensing means as a moving image data file in the recording medium, and a still image sensing operation for recording a still image sensed by the image sensing means as a still image data file in the recording medium; and generation means for, in a case where a still image sensing instruction is input during the moving image sensing operation, dividing a time period for performing the still image sensing operation into a first period and a second period that follows the first period, and generating a moving image data file by inserting a substitute image in the first and second periods, wherein the generation means inserts a predetermined substitute image in the first period, and the generation means inserts an image corresponding to a still image sensed in response to the still image sensing instruction in the second period.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4D show the sequences. when a still image is sensed during moving image recording according to the embodiment of the present invention.

DETAILED DESCRIPTION OF THE PREFERRED EMBODIMENTS

A preferred embodiment of the present invention will be described in detail hereinafter with reference to the accompanying drawings.

Figure 1:
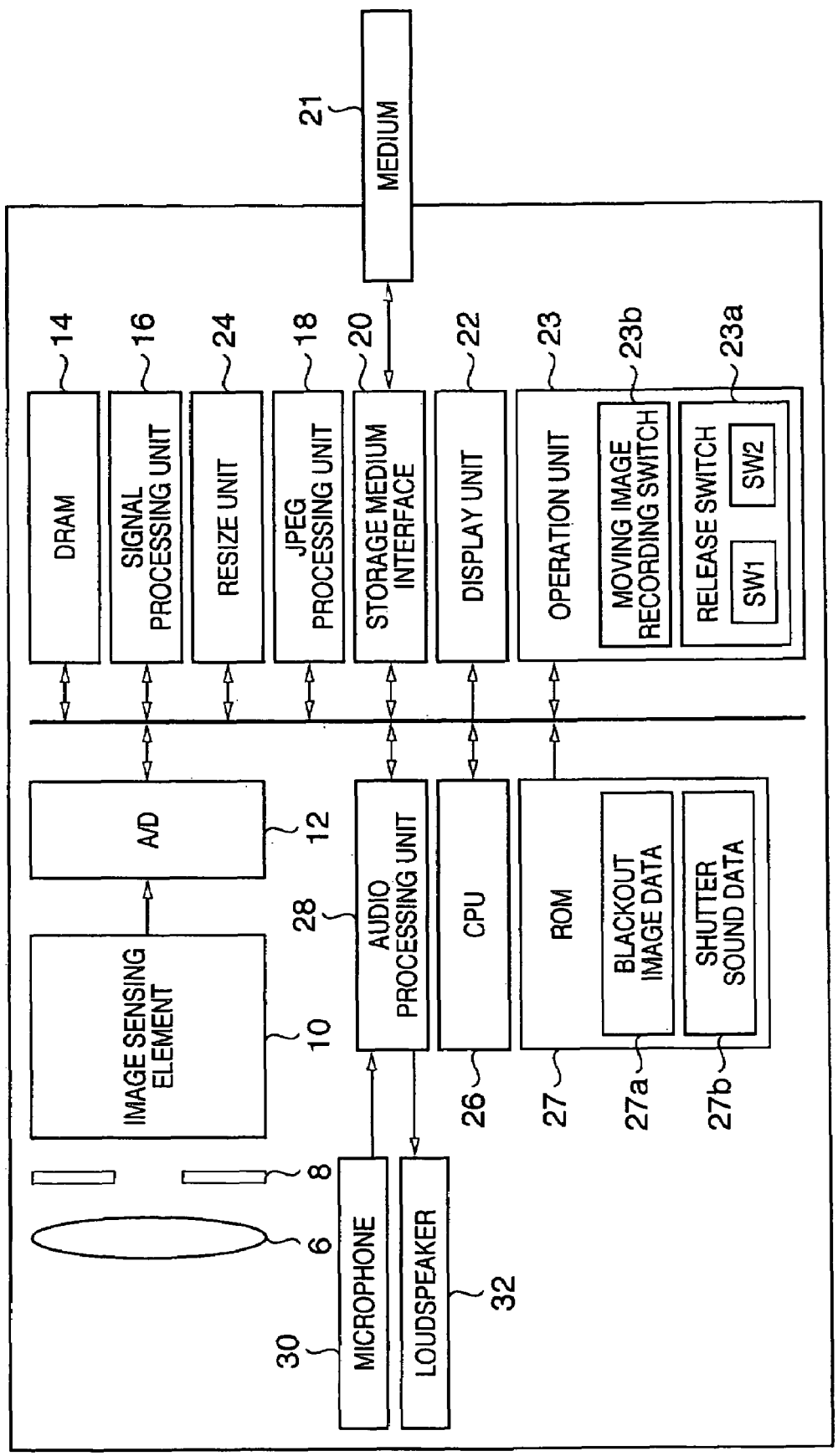
FIG. 1 is a block diagram of a digital camera according to an embodiment of the present invention.

FIG. 1 is a block diagram of a digital camera 100 as an image sensing apparatus according to an embodiment of the present invention.

Referring to FIG. 1, reference numeral 6 denotes an image sensing lens, which comprises one or a plurality of lenses. Reference numeral 8 denotes an exposure control unit which comprises an aperture, shutter, and the like, and adjusts an exposure value depending on the luminance of an object. Reference numeral 10 denotes an image sensing element as image sensing means such as a CCD sensor, CMOS sensor, or the like which has about several million pixels, and outputs analog image signals of respective color components obtained by image sensing. Reference numeral 12 denotes an A/D converter which converts analog image signals from the image sensing element 10 into digital signals.

Reference numeral 14 denotes a DRAM which has a buffer function of temporarily storing digital image signals from the A/D converter 12 and temporarily storing image data after signal processing to be described later, JPEG data after JPEG compression, and the like. Normally, data is read out from or written in the DRAM via a memory controller, which is not shown in FIG. 1. Reference numeral 16 denotes a signal processing unit which processes digital image data obtained by the A/D converter 12 into a luminance signal and color difference signals, i.e., which generates YUV data as preliminary data used to generate JPEG data of a recording format prevalent to digital cameras. Reference numeral 18 denotes a JPEG processing unit which compresses YUV data from the signal processing unit 16 into a JPEG format, and decompresses JPEG data into YUV data.

Reference numeral 20 denotes a recording medium interface used to write and read out JPEG-processed data in and from a recording medium such as a CF, SD card, or the like. Reference numeral 21 denotes a detachable recording medium such as the CF, SD card, or the like described above. Note that the recording medium is not particularly limited as long as it is randomly accessible. For example, an optical disk (DVD) may be used. Reference numeral 22 denotes a display unit which comprises a color liquid crystal display or the like, and displays a viewer, a sensed image as a review image, and a decompressed image as a playback image. Note that the digital camera comprises a terminal used to output a video signal to an external display device such as a TV or the like. Reference numeral 24 denotes a resize unit which resizes YUV outputs from the signal processing unit 16 to an arbitrary size.

Reference numeral 26 denotes a CPU which controls the aforementioned processing units, data flows, and the like. Reference numeral 27 denotes a ROM which stores a program (firmware) and various kinds of information associated with the processing sequence of the CPU 26. As will be described later, this ROM 27 pre-stores blackout image data which has already been JPEG-encoded, and wave-format data of a pseudo shutter sound. The respective processing units are connected to a bus of the CPU 26. Although not shown, a DMAC required to perform DMA transfer without the intervention of Read/Write accesses to the CPU is inserted between respective devices and the DRAM 14. Furthermore, paths used to directly exchange data from the A/D converter 12 to the signal processing unit 16 and from the signal processing unit 16 to the JPEG processing unit 18, resize unit 24, and the like are formed independently of the CPU and DMA although not shown.

Reference numeral 28 denotes an audio processing unit which is used to execute audio recording and playback processes. Reference numeral 30 denotes a microphone used to input an audio signal upon audio recording; and 32, a loudspeaker used to play back an audio signal. The audio. processing unit 28 records and plays back an audio signal by also performing A/D conversion and D/A conversion of the audio signal.

Reference numeral 23 denotes an operation unit which includes various buttons, a dial switch, and the like as well as a release switch 23a used upon still image recording and a moving image recording switch 23b used to turn on/off moving image recording.

The arrangement of the digital camera according to this embodiment has been described. The moving image sensing operation of this embodiment will be described below.

Light which has passed through the image sensing lens 6 passes through the exposure control unit 8 including the aperture and shutter to undergo exposure control, and forms an image on the image sensing element 10. In a moving image sensing mode, the shutter having a mechanical structure is opened, and the exposure value is controlled by the aperture. The image sensing element 10 photoelectrically converts an object image into analog signals, and sends them to the A/D converter 12. The A/D converter 12 converts the analog image signals into digital image data, and transfers the digital image data to the signal processing unit 16 via a system bus.

In the moving image sensing mode, not all pixels but those which are decimated (or added and superposed) in the horizontal and vertical directions are read out in synchronism with the recording frame rate. In order to reduce the load on the resize unit 24, the signal processing unit 16 applies horizontal/vertical filter processing, aperture correction processing, gamma processing, and the like to digital data in the moving image sensing mode, and transfers the processed data to the resize unit 24. The resize unit 24 resizes the received data to a VGA size (640 pixels in the horizontal direction×480 lines in the vertical direction), and transfers the resized data to the DRAM 14. The VGA image data on the DRAM 14 is transferred to the display unit 22 and is displayed on the TV or the liquid crystal display of the camera as a through image. The standby state in the moving image sensing mode corresponds to the state until this display processing.

In this state, when the moving image recording switch 23b of the operation unit 23 is pressed, moving image recording starts. That is, the VGA image data on the DRAM 14 is converted into JPEG data by the JPEG processing unit, and an audio signal captured via the microphone 30 is converted into wave audio data by the audio processing unit 28. Using these JPEG image data WAVE audio data, the CPU generates a moving image file of an AVI data format by appending a header and the like, and records the moving image file on the medium 21 via the recording medium interface 20. This moving image recording processing is executed until the moving image recording switch 23b is pressed again. A state which meets both the standby state of the moving image sensing mode, and the state in which the moving image sensing processing is being executed will be referred to as a moving image sensing operation state hereinafter.

Note that the data structure of the AVI file forms a file by managing the allocations of video and audio data using a header at the head of the file. For example, the header is followed by audio data (44.1 kHz sampling, 16-bit stereo) of about 172 kbytes for 1 sec, which is followed by JPEG data of individual frames of video data for 30 frames for 1 sec in case of 30 fps (frames/sec). Next, audio data and video data are alternately allocated at 1-sec intervals. As a method of generating the moving image file, an image buffer area used to buffer JPEG still image data by the aforementioned processing, and an audio buffer area used to buffer audio data are assured on the DRAM 14 to store generated video data and audio data in these areas. Then, the video data and audio data are combined into AVI data at 1-sec intervals, and the AVI data is written in an AVI buffer area on the DRAM 4. In this case, the audio data has a fixed data size for 1 sec since it has the WAVE format, but the video data has an indefinite size (variable length) since it is JPEG data. The above video buffer is commonly used as the video area of the AVI data, and upon deleting the DRAM, the JPEG data can be written while clearing the audio data area on the AVI buffer area. Data stored in the AVI buffer area are sequentially written in the medium 21 as a file.

When AVI data for a moving image is to be played back, audio data and video data are loaded from the AVI file on the medium 21 and are stored on a playback buffer area on the DRAM 14, and the audio data and video data are individually processed and played back as follows.

First, the CPU 26 transfers audio data from the audio buffer on the DRAM 14 to the audio processing unit 28. The audio processing unit 28 internally applies D/A conversion, gain adjustment, and the like to the audio data, and sends an analog audio signal to the loudspeaker 32 to play back the audio signal of the moving image.

On the other hand, video data is transferred frame by frame from the video buffer on the DRAM 14 to the JPEG processing unit 18 by DMA transfer, and is decompressed from JPEG data to YUV data. The decompressed YUV data is output from the JPEG processing unit 18 to the resize unit 24, is resized to a VRAM size (720 pixels×480 lines) to be displayed on the TV or liquid crystal display, and is written out on a VRAM area of the DRAM 14. Upon displaying on the TV or liquid crystal display, the VRAM data on the DRAM 14 is DMA-transferred to the display unit 22, and undergoes processing to be displayed on the TV or liquid crystal display.

The still image sensing operation of this embodiment will be described below.

In a standby state of still image sensing, substantially the same processing as in the standby state of the moving image sensing mode is applied, and a through image of an image sensed by the image sensing element 10 is displayed on the display unit 22. The release switch 23a of the operation unit 23 has two stroke switches: when the switch 23a is pressed to its half stroke position, a switch SW1 is turned on; when the switch 23a is pressed to its full stroke position, a switch SW2 is turned on. When the switch SW1 is ON, an image sensing preparation state is set, and when the switch SW2 is ON, a still image sensing operation state is set.

More specifically, when the switch SW1 is ON, i.e., in the image sensing preparation state, auto focusing (AF) and auto exposure (AE) required to sense a still image are done. When the switch SW2 is turned on, and the preparation state is switched to the still image sensing operation state, the read operation of the image sensing element 10 is stopped after the shutter is closed, and an exposure mode is then selected. The aperture is set according to an exposure setting value calculated from the object luminance in the process of the image sensing preparation state, and the shutter is opened and closed at the calculated shutter speed after a residual charge of the sensor is discharged. After the shutter is fully closed, the image sensing element 10 is switched from the exposure mode to a read mode, and data of all pixels are read out while being divided into a plurality of fields. The readout signals are converted by the A/D converter 12 into digital signals, and RAW data are transferred from the A/D converter 12 to the DRAM 14 via the bus. Upon completion of the read operation from the image sensing element 10, development processing starts. In this development processing, the above RAW data are read out from the DRAM 14 and are transferred to the signal processing unit 16. The signal processing unit 16 applies horizontal/vertical filter processing, aperture correction processing, gamma processing, and the like to the RAW data in the still image sensing mode, and transfers the processed data to the JPEG processing unit 18. The JPEG processing unit 18 converts YUV data into JPEG data, and writes back the JPEG data onto the DRAM 14. The processing from when the RAW data are read from the DRAM 14 until the JPEG data are written back to the DRAM 14 corresponds to the development processing. After that, the generated still image data (JPEG image data) is written in the medium 21 as a still image file. The YUV data from the signal processing unit 16 in the middle of the development processing are also transferred to the resize unit 24. The resize unit 24 resizes the YUV data to about a VGA size to display a review image, and writes them back to the DRAM 14. Upon completion of the above development processing, the YUV data with the VGA size are transferred to the display unit 22 to display a review image used to confirm a sensed image on the TV or the liquid crystal display of the camera. In this manner, a review image is displayed.

The moving image sensing operation and still image sensing operation according to this embodiment have been described. In this embodiment, a still image is allowed to be sensed even during moving image recording. That is, the still image sensing processing and still image recording processing by the still image sensing operation can be executed while continuing the moving image recording processing. The processing of the CPU 26 upon sensing a still image during moving image recording will be described below with reference to the flowchart of FIG. 2.

Figure 2:
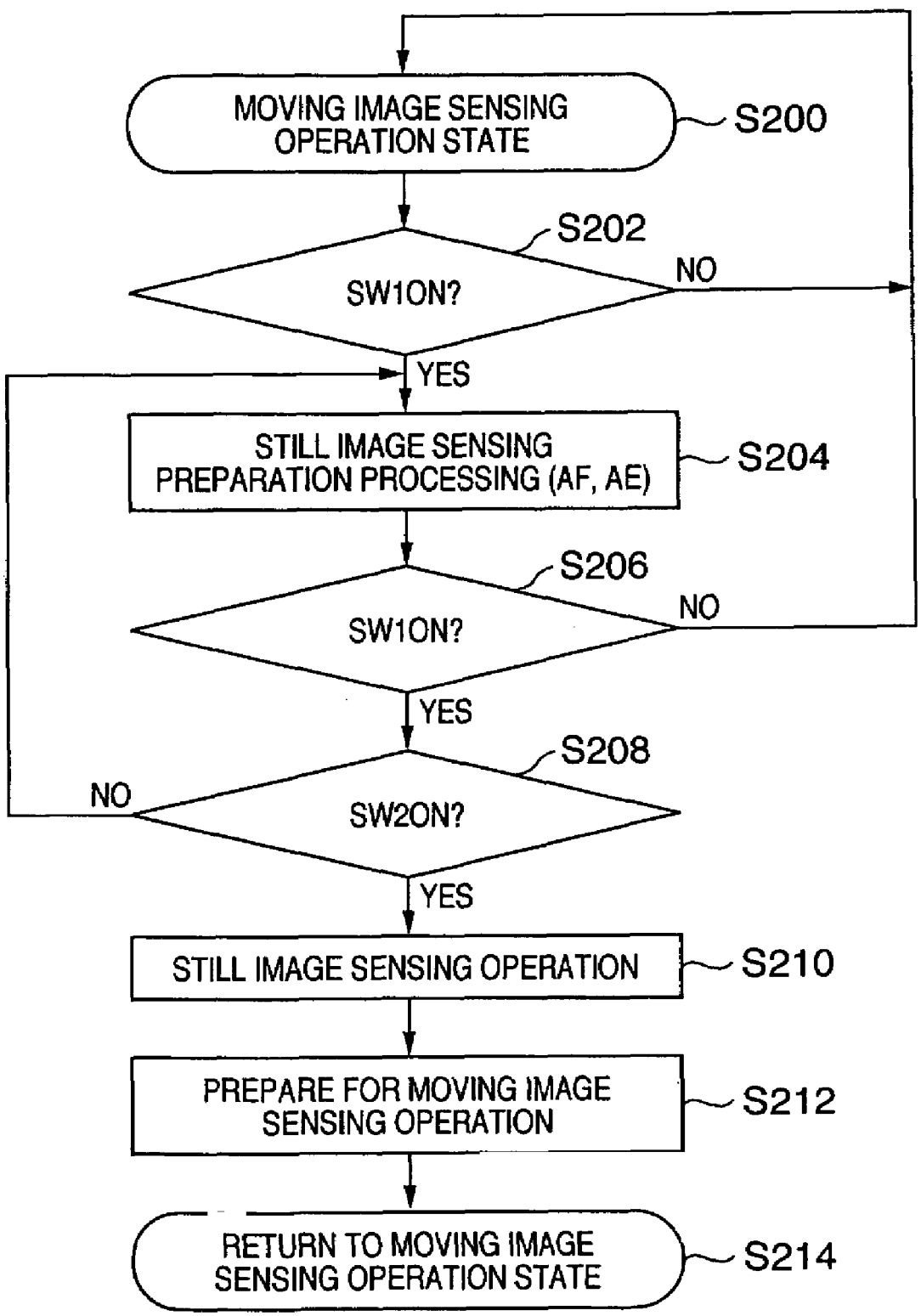
FIG. 2 is a flowchart showing the processing sequence when a still image is sensed during moving image recording according to the embodiment of the present invention.

Step S200 in FIG. 2 shows a state in which a moving image is sensed and recorded according to the aforementioned moving image sensing operation. That is, the moving image recording button 23b of the operation unit 23 is pressed, and an AVI file as a moving image is being formed on the medium 21.

It is monitored and determined in step S202 if the switch SW1 used to detect the half stroke position of the release switch 23a is ON during this moving image recording. If the switch SW1 is OFF, the normal moving image recording operation is continued.

If the release switch is pressed to its half stroke position, and the switch SW1 is turned on, the flow advances to step S204 to execute AF (focusing) and AE (exposure) of the image sensing preparation of a still image simultaneously with moving image recording. In step S206, the switch SW1 is monitored, and if the switch SW1 is held ON, the AF and AE operations are continued. However, if the switch SW1 is turned off, the image sensing preparation of a still image ends. However, the CPU 26 continues the moving image recording processing even in such case.

If the switch SW1 is held ON and the image sensing preparation is completed, the flow advances to step S208 to monitor and determine if the release switch is pressed to its full stroke position, i.e., if the switch SW2 is turned on. If the switch SW2 is OFF and the switch SW1 is held ON, the AF and AE operations are continued again. On the other hand, if it is determined that the switch SW2 is turned on, the flow advances to step S210 to execute a still image sensing operation.

The still image sensing operation in step S210 is substantially the same as that described above, except for the following point. That is, since the still image sensing operation is performed during moving image recording, moving image recording is temporarily interrupted. At this time, since the driving mode of the image sensing element 10 is switched, and a moving image frame based on a moving image cannot be generated, a substitute frame is inserted in place of the omitted moving image frame. This processing will be described later using the moving image file generation flow upon executing the still image sensing operation in FIG. 3.

Upon completion of the still image sensing operation, preparation for the interrupted moving image sensing operation is made in step S212, and the flow returns to the moving image sensing operation state in step S214.

Figure 3:
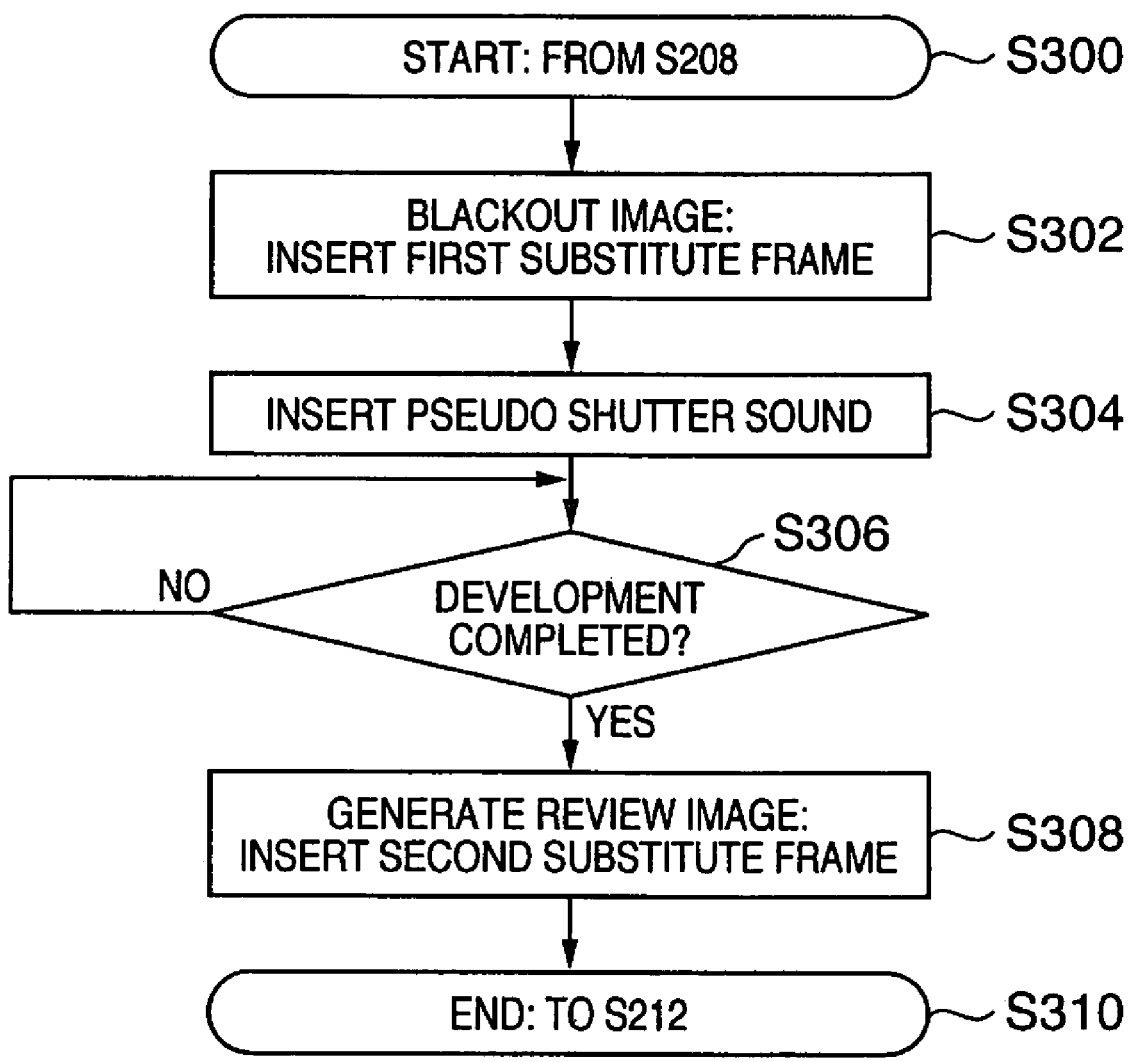
FIG. 3 is a flowchart showing the moving image file generation processing sequence when the still image sensing operation in step S210 in FIG. 2 is made.

The moving image file generation processing sequence in FIG. 3 is executed substantially parallel to the still image sensing operation, and step S300 is started in response to YES determined in step S208 in FIG. 2.

In step S300, the CPU 26 starts this processing. The flow advances to step S302 and the CPU 26 inserts a blackout image as a first substitute frame of a moving image frame during a period in which the moving image sensing operation is interrupted to perform the still image sensing operation. Note that the blackout image is black non-image JPEG data, and has a very small data size since a black image is JPEG-compressed. This blackout image corresponds to blackout data 27a stored in the ROM 27. The blackout image data 27a has already been resized to a VGA size, and has been JPEG-compressed. This blackout data 27a is read out from the ROM 27, and is inserted into a moving image file (AVI data) as a first substitute frame. The duration (time period) of the first substitute frame is equal to a longest exposure time of a camera green mode (AUTO mode), and is about ⅛ sec (125 msec). When a moving image is sensed at 30 frames/sec, since the number of frames for ⅛ sec is "4", the blackout image data 27a in the ROM 27 is inserted four times into the AVI file. Note that an image having a message "still image sensing" or the like may be inserted in place of the blackout image.

In step S304, pseudo shutter sound data 27b stored in the ROM 27 is read out and is inserted in audio data of the moving image file (AVI data). At the same time, the pseudo shutter sound data 27b is output to the audio processing unit 28, and is played back from the loudspeaker 32. The time duration of this pseudo shutter sound data is set to be substantially the same as that of the above blackout image data. At this time, when audio data recorded via the microphone 30 is suddenly replaced by pseudo data, high-frequency components are generated due to sudden replacement of the data, and noise data is generated by aliasing. Audio data during a time period (which is also a time period in which the pseudo shutter sound is played back via the loudspeaker 32) in which the audio data is to be replaced by the pseudo data is muted by the audio processing unit 28. The pseudo shutter sound is inserted onto the muted audio data. In this way, a high-quality pseudo shutter sound can be inserted into data without generating any high-frequency noise due to aliasing.

In step S306, the control waits for completion of the development processing of a still image in the aforementioned still image sensing operation. After completion of development, the flow advances to step S308. After that, the CPU 26 JPEG-encodes the developed still image using the JPEG processing unit 18, and generates one still image file from the encoded data as the processing in step S210 in FIG. 2. The generated still image file is stored in the recording medium 21 independently of the moving image file. Parallel to this processing, the CPU 26 then generates a review image of a VGA size from the developed still image using the resize unit 24, and encodes the resized image data using the JPEG processing unit 18. The encoded image of the VGA size is used as second substitute frame data. After the blackout image data of the first substitute frame, the second substitute frame data is inserted to compensate for moving image frames corresponding to the interrupted moving image recording during the development processing period. That is, the second substitute frame data is repetitively inserted into the AVI file an appropriate number of times. Audio data during the second substitute frame period is converted into WAVE data by the audio processing unit 28, and the converted data is inserted into the AVI file.

That is, upon playing back this AVI file, the pseudo shutter sound is played back during a blackout period of the first substitute frame of the time period interrupted by the still image sensing operation, a frame corresponding to the image sensed as a still image in practice is played back during a stop-motion image period of the second substitute frame, and audio data recorded during this period is played back together.

In step S310, the flow returns to step S212 in FIG. 2 to perform restart preparation of the moving image sensing operation. In this operation, the read mode of the image sensing element 10 is switched to that for a moving image. At the same time, the settings of the signal processing unit 16, resize unit 24, JPEG processing unit 18, and the like are switched to those for a moving image, and the data path is also switched. In step S214, the flow returns to the original moving image sensing operation to continue to sense an image for moving image recording.

FIGS. 4A to 4D show the sequences of the still image sensing operation during moving image recording. FIG. 4A shows a transition state (sequence) of the operation state of the camera upon image sensing. FIG. 4B shows a transition state (sequence) of an image upon displaying a through image upon image sensing on the display unit 22. FIG. 4C shows the recording state of the generated moving image file (AVI format) in correspondence with the actual image sensing and recording sequences. In other words, FIG. 4C shows a transition state (sequence) of an image to be displayed on the liquid crystal display or the TV monitor upon playing back the moving image file (AVI format). Furthermore, FIG. 4D assumes a write timing of the generated AVI file in the medium. As will be described later, the recording processing onto the media of the moving image sensing operation and still image sensing operation does not match the timing in FIG. 4A.

In FIGS. 4A to 4D, a time period from the left end until the switch SW1 of the release switch is turned ON indicates the moving image sensing operation state. A time period S400 in FIG. 4A indicates the moving image sensing operation state, a through image of the moving image is displayed on the display unit 22 in a time period S418 in FIG. 4B, and a moving image and audio data are recorded as a moving image file in a time period S428 in FIG. 4C.

A next time period S402 in FIG. 4A from when the switch SW1 is turned on until the switch SW2 is turned on indicates a state in which the AE and AF operation of the image sensing preparation for a still image are executed while executing the moving image sensing operation and recording operation. The AE and AF operation state of the image sensing preparation for a still image is displayed on the display unit 22 in a time period S420 in FIG. 4B, and that AE and AF operation state of the image sensing preparation for a still image is recorded in the moving image file in a time period S430 in FIG. 4C.

The timings of the time periods until the switch SW2 is turned on are matched. However, timings after the switch SW2 is turned on are not matched. This sequence will be described below.

A time period S404 in FIG. 4A indicates a mode switching state of the image sensing element 10 immediately after the switch SW2 is turned on. In this time period, the read mode for a moving image is switched to the exposure mode for a still image. A next time period S406 indicates an exposure period of the still image state. For example, an exposure time of this embodiment is set by variably controlling an exposure value of an object image from 1/2000 sec to 1/8 sec. A next time period S408 indicates a read period in which all pixels for a still image are read out from the image sensing element 10 in a plurality of fields, and requires, e.g., about 300 msec. A next time period S410 indicates a time period of the still image development processing. As the contents of the development processing, the aforementioned processing for reading out RAW data from the DRAM 14 and writing back the processed JPEG data to the DRAM 14 is executed. A next time period S412 indicates a time period in which a review image is generated. In this time period, the processing with the above contents, i.e., processing for resizing YUV data from the signal processing unit 16 to a VGA size by the resize unit 24, and writing back the resized image data to the DRAM 14 as a review image is executed. From this time period S404 to a time period S412, as shown in FIG. 4B, a blackout image (non-image) is displayed on the display unit 22. This is to apparently inform the user that the camera captures a still image and executes development processing during the still image sensing processing, and a non-image different from the through image of an EVF is displayed, i.e., the same display operation as in the normal still image sensing operation is made.

A time period S414 indicates a time period in which the second substitute frame data to be inserted into the moving image file is generated based on the review image generated in the time period S412. In this time period the YUV data of the VGA size are compressed to JPEG data by the JPEG processing unit 18 and are copied in correspondence with the number of omitted, short moving image frames, and a moving image file is generated by combining with audio data at that time.

A time period S424 in FIG. 4B indicates a time period in which the review image generated in the time period S414 is displayed on the display unit 22.

A time period S432 in FIG. 4C indicates a time period in which a time period obtained by combining the mode switch period of the image sensing element 10 as the time period S404 upon sensing a still image on the moving image file, and the exposure period of the time period S406 is compensated for by substitute frames as blackout images, i.e., non-display images. Although the exposure time can be varied depending on the luminance level of an object, as described above, the substitute frames are inserted to fix the time period S432 as a blackout period.

This fixed time period is set to be the longest exposure time (50+125=175 msec) in this embodiment. This time period of about 175 msec allows the user to recognize a non-display image upon playing back a moving image. For example, in case of an AVI moving image at 30 fps (frames/sec), one frame corresponds to about 33 msec, and the number of frames is about 4 to 6. Three frames or less of a non-display image are not suited to allow the user to recognize that the shutter is closed since the moving image changes too fast. When a non-display image period of 200 msec or more (seven frames or more) continues, the user may feel that the moving image is interrupted without any specific reason. Therefore, a substitute frame period based on a blackout image which allows the user to recognize a shutter close image using moving image frames is always fixed to a time ranging from 100 to 200 msec.

Furthermore, a pseudo shutter sound is inserted in synchronism with this time period S432. The duration of the pseudo shutter sound is set to be less than about 200 msec since it is a sharp shutter sound, and is conveniently assigned to the substitute frame period of the above blackout image. As for the insertion method of the pseudo shutter sound, as described above, audio data of the blackout period is muted by the audio processing unit 28, and the pseudo shutter sound is superposed on the muted period. In this way, noise is prevented from being generated due to an abrupt data change between the recorded audio data and the pseudo sound. Upon muting, the audio gain of the recorded audio data is gradually decreased to a mute level in place of immediately muting the recorded audio data.

Next, a time period S434 in FIG. 4C indicates a time period in which substitute frame data based on the review image of the still image generated in the above time period S414 is inserted as omitted moving image frame data, and such time period is called a stop-motion period on the moving image file. This time period corresponds to a time period immediately after the substitute frame period of the blackout image until a moving image restarts.

After completion of the still image sensing operation, the following processes are made. That is, a time period S416 in FIG. 4A indicates a state in which the moving image sensing operation restarts, a time period S426 in FIG. 4B indicates display of a through image of a moving image on the display unit 22, and a time period S436 in FIG. 4C indicates a state in which a moving image is recorded on the moving image file.

Normally, actual shutter operations upon sensing a still image are made like "close→open→close". However, in order to make the user imagine that still image sensing operation on the moving image file, operations are made like "moving image→shutter close →stop-motion image display of still image→shutter close→moving image". However, during the moving image sensing operation, it is suited for moving image recording to restart a moving image as soon as the user recognizes a still image displayed as a stop-motion image and, hence, a sequence "moving image→shutter close→stop-motion image display of still image→moving image" is best suited by omitting shutter close immediately after the stop-motion image display. This shutter close is attained by inserting the blackout image as substitute frames, as described above, and the display period of the stop-motion image is also preferably fixed. Furthermore, the display period of the stop-motion image need be longer than that of the blackout image since the user must confirm the sensed image. However, this display period may disturb the moving image sensing operation if it is too long, and is preferably set to fall within a second predetermined time, to which a time period until a moving image restarts of that of the still image processing is desirably applied in terms of the camera operation. More specifically, of an interrupted time period until the moving image sensing operation restarts, a time period other than the substitute frames of the blackout image is substituted by the stop-motion image of the still image.

In this embodiment, when a still image is sensed during moving image recording, that still image is displayed as a stop-motion image for about 800 msec.

Furthermore, a difference between display upon image sensing and that upon playing back a moving image file of the still image sensing operation during moving image recording of this embodiment will be described below.

As described above, the exposure time of the time period S406 is variable depending on the object luminance, and is often shorter than the sequences shown in FIGS. 4A to 4D. In such case, the read start time from the image sensing element 10 is moved up, and the blackout (non-image upon image sensing) display period of the time period S422 is consequently shortened. However, the blackout time period S432 of the moving image file is fixed, and the display period of the stop-motion image of the time period S434 is also fixed, as described above. Therefore, in this case, the time period S424 for displaying a review image upon image sensing is prolonged. The development time of the time period S410 varies depending on the recording mode of the camera. The recording mode means each individual mode when the recording size is changed, since the recording size of five million pixels is 2592 (horizontal)×1944 (vertical), that of four million pixels is 2272 (horizontal)×1704 (vertical), and that of three million pixels is 2048 (horizontal)×1536 (vertical). Since the data size to be processed changes when the recording size is changed, the development time becomes variable. When the development processing time period S410 changes, the blackout display period S422 and the review display period S424 upon image sensing change accordingly as in the exposure time. However, the blackout display period S432 and the stop-motion display period S434 on the moving image file are fixed without being changed. More specifically, the number of first substitute frames and the number of second substitute frames (stop-motion image using a review image) from the beginning of the blackout display period can always be fixed. Therefore, arithmetic operations for the generation processing in FIG. 3 by the CPU 26 can be simplified, and the user can be clearly informed of the still image sensing state always using fixed expression.

Recording on the medium will be described below using FIG. 4D.

The AVI file of a moving image has a data structure of the format in which audio data and video data are alternately allocated at 1-sec intervals. By writing out AVI data on the AVI buffer area onto the medium as a file, an AVI file is generated on the medium. A time period S440 in FIG. 4D indicates a time period in which AVI data generated by moving image sensing is written out onto the medium. A time period S442 in FIG. 4D indicates a moving image recording period after the ON timing of the switch SW1. In this time period as well, the AVI file of a moving image is kept recorded as in S440. This time period does not end at the ON timing of the switch SW2, i.e., at the timing at which the moving image read operation from the sensor is interrupted, and AVI data generation is also interrupted. At this timing, since AVI data remains stored on the AVI buffer area on the DRAM 14, the data remaining on the AVI buffer must be kept written out onto the medium. The timing when all the data on the AVI buffer area are written out onto the medium corresponds to the transition timing from the time period S442 to the time period S444 in FIG. 4D.

A time period S444 in FIG. 4D indicates a write-out timing of blackout data corresponding to the aforementioned blackout period of the time period S432 onto the medium. Since AVI data used to display a blackout image is immediately generated from the ON timing of the switch SW2, it can be written out immediately after the AVI data remaining on the AVI buffer area are written out. Furthermore, since the write speed of the medium is sufficiently high and the write-out operation onto the medium can be made at substantially the same timing with AVI file generation, since no data remains on the AVI buffer, the AVI data of the blackout image in the time period S444 can be performed immediately after the switch SW2 is turned on. Since the AVI data of the blackout image has a small data size, it can be written within a relatively short period of time. The write speed onto the medium varies depending on media to be used. When the write speed is high, there is no data to be written after the AVI data of the blackout image is written in the time period S444 until a next time period S446, and a time in which no write access occurs is produced. The next time period S446 indicates the write-out timing of a JPEG data file (still image file including all pixels obtained as a result of the development processing according to the recording mode) of a sensed still image. Since the still image JPEG data is generated at the aforementioned timing of the time period S410, it is written out onto the medium after that timing. Immediately after the still image JPEG data is written out in the time period S446, a time period S448 indicates the write-out timing of AVI data generated based on a review image after the still image is sensed. The AVI data of the review image in this time period S448 is recorded for the second substitute frame period of the aforementioned time period S434. After the AVI data of the review image in the time period S448 is written, AVI data of a moving image generated in the above time period S416 is stored on the AVI buffer, and is written out onto the medium at the timing of a time period S450. The data write sequence onto the medium when a still image is sensed during moving image recording has been described. When the AVI data recorded in this way is played back as described above, the situation of the still image sensing operation during moving image recording can be clearly displayed for the user.

As described above, according to this embodiment, the user can be expressly informed of the time position of a still image which is sensed during moving image recording, and that sensed still image when a moving image is played back. At the same time, the user can be explicitly informed of the situation upon moving image recording.

When the release switch is pressed to its half stroke position, i.e., when the switch SW1 is ON and the switch SW2 is OFF, a button mark of the release switch may be composited on a corner in a moving image which is being sensed. In this case, the user can be informed that a still image is about to be sensed immediately before a blackout image is displayed as a result of the still image sensing operation.

Another Embodiment

In the above embodiment, when a still image is sensed during moving image recording, substitute frames which are generated based on a blackout image and a stop-motion image from a still image are generated and inserted as moving image frames corresponding to the moving image sensing operation which is interrupted by the still image sensing operation. At this time, as audio data, the pseudo shutter sound is inserted during the blackout image period, and recorded audio data is assigned to the stop-motion image in real time. That is, in an embodiment for a case in which the exposure time of the time period S406 in FIG. 4A is equal to or shorter than 125 msec, the real time of the audio data upon recording is continuous.

As another embodiment, a case will be explained below wherein a still image sensing operation is done for a longer exposure time than ⅛ sec=125 msec. When a still image sensing operation with a very long exposure time is performed during moving image recording, the interruption time of a moving image becomes long. However, when the moving image file is played back, the blackout period and stop-motion image period are preferably fixed upon playback as in the short exposure time described in the above embodiment in place of inserting substitute frames in correspondence with the interrupted period. In this case, since the real recording time is different from the playback time, moving image frames and audio data to be discarded (not to be recorded in a moving image file) are generated. As video data on the moving image frames, the blackout period of the exposure time is different from the real time upon image sensing. That is, moving image frames during the blackout period are discarded. Since audio data is discarded in correspondence with the moving image period to be discarded, audio data immediately after the pseudo shutter sound is discarded in correspondence with the exposure time. Since audio data can also be recorded and played back after the stop-motion image in the time period S434 on the moving image file, audio data after the stop-motion period of this time period S434 to a time period that returns to a moving image is continuous. When a still image sensing operation is made for a long exposure time during moving image recording, a still image sensing operation free from any limitation on the exposure time can be made, and unnecessary substitute frames need not be inserted as moving image frames interrupted by the still image sensing operation, thus preventing moving image file data from being undesirably increased.

Furthermore, some users want to record full audio data without discarding it even when moving image frames are substituted by substitute frames upon sensing a still image for a long exposure time. In such case, a stop-motion image display period of the moving image interrupted period is prolonged. The blackout period may always be fixed to about 200 msec. In this manner, upon sensing a still image for a long exposure time during moving image recording, video data of the moving image file is interrupted for a long period of time, and the stop-motion period is prolonged. However, audio data can be recorded without being interrupted. When a moving image is played back, the display period of a stop-motion image is prolonged, but audio data plays back that scene. Therefore, the user can recognize that the still image was sensed for a long exposure time, and can be audibly and scrupulously informed of the image sensing state.

Moreover, as another method, another image which allows the user to imagine shutter close may be displayed in place of the blackout period as the non-image display period. For example, image data which expresses a state in which a mechanical shutter is gradually closing may be used as the first substitute image of the AVI data, or a blue frame may be displayed in place of a black frame.

In the above embodiment, the moving image data file has the AVI format. However, the moving image data file may have another format, e.g., MPEG or the like. If the standard of the file format used permits, a method of recording one substitute frame data and the number of times of repetition (time) of that data in place of repetitively recording substitute frame data may be used.

As described above, according to this embodiment, the user can be expressly informed of the time position of a still image which is sensed during moving image recording, and that sensed still image when a moving image is played back. At the same time, the user can be naturally informed of the situation upon moving image recording.

According to this embodiment, since the number of blackout image frames to be inserted as a moving image is set in correspondence with an open time (exposure time) of the shutter upon sensing a still image, the still image sensing state can be faithfully reproduced in a moving image upon playing back the moving image.

According to this embodiment, when the exposure time as an open time of the shutter upon sensing a still image is limited to a first predetermined time or shorter, the interrupted time of the moving image file can be limited to fall within a time that does not cause the user to feel unnatural.

According to this embodiment, even when a still image is sensed for a long exposure time, as a time period expressed by blackout image data is set to be the same as that for a short exposure time, the still image sensing state can be played back always using the same expression upon playing back a moving image. Hence, the still image sensing state can be played back during playback of the moving image file without making the user feel uneasy.

According to this embodiment, since the time period in which a blackout image is inserted is set to be a duration corresponding to an integer multiple of the sampling period of moving image frames, a time difference from an actual moving image sequence can be removed.

According to this embodiment, frames of an actually sensed still image are stored as moving image frames after the blackout image, and the insertion period of the still image frames is set to be a time period obtained by adding the read period of the image sensing element and the still image development period. As a result, upon playing back a moving image, the user can be scrupulously informed of a review display state after the still image sensing operation. When the user senses a still image during moving image recording, he or she can be scrupulously informed of that still image as a stop-motion image.

According to this embodiment, since a still image frame to be inserted uses an image obtained by resizing an actually sensed still image, an image displayed as a stop-motion image upon playing back a moving image can be matched with an image using all pixels of the image sensing element 10.

According to this embodiment, since the time period of a still image inserted as a part of the moving image file is set to be a time period obtained by adding the read time from the image sensing element and the time required to develop a still image by still image processing means, the time period of a stop-motion image to be inserted in the moving image file can be fixed. In addition, upon playing back a moving image, a time that allows the user to sufficiently recognize a sensed still image in the moving image can be assured, and the user can be scrupulously informed of that still image.

According to this embodiment, upon sensing a moving image, a through image from the image sensing element is displayed on the display unit 22. Also, a blackout image is displayed on the display unit 22 in a time period until a still image is obtained via the still image sensing operation during the moving image sensing operation, and a review image of that still image is displayed on the display unit 22 in a time period until recording of that still image is completed. In this way, display of the still image sensing operation during moving image recording can be the same as that of the normal still image sensing operation, thus allowing a natural still image sensing operation during moving image recording for the user.

According to this embodiment, the display period of a blackout image to be displayed on the display unit 22 in the still image sensing operation during moving image recording depends on the still image processing. However, the blackout period upon moving image playback can be set to be a time that allows the user to imagine that the shutter is closed, thus allowing natural playback.

According to this embodiment, when a still image is sensed, a pseudo shutter sound is generated simultaneously with a blackout image upon moving image playback. Hence, the user can surely recognize that the still image was sensed.

According to this embodiment, since the time of a blackout image recorded as a moving image is set in correspondence with that of the pseudo shutter sound, the blackout image and the still image sensing operation can be synchronized.

According to this embodiment, even when the exposure time of the still image sensing operation in a moving image is longer than the first substitute frame period generated as a non-signal image (blackout image) to be inserted in the moving image file, unnecessary substitute frames need not be inserted into the moving image file, thus preventing the moving image file size from being increased.

As many apparently widely different embodiments of the present invention can be made without departing from the spirit and scope thereof, it is to be understood that the invention is not limited to the specific embodiments thereof except as defined in the claims.

This application claims priority from Japanese Patent Application Nos. 2005-138730, filed May 11, 2005, and 2006-071496, filed Mar. 15, 2006, which are hereby incorporated by reference herein in their entirety.

What is claimed is:

1. An image sensing apparatus which comprises an image sensing unit and records image data sensed by the image sensing unit in a recording medium, comprising:
   an image sensing operation controller that controls a moving image sensing operation for recording a moving image obtained by continuously sensing an image by the image sensing unit as a moving image data file in the recording medium, and a still image sensing operation for recording a still image sensed by the image sensing unit as a still image data file in the recording medium;
   a generation unit that, in a case where a still image sensing instruction is input during the moving image sensing operation, divides a time period for performing one still image sensing operation into a first period and a second period that follows the first period, and inserts a substitute image as a frame in the first and second periods into the moving image data file being generated in the moving image sensing operation by:
   inserting into the moving image data file in the first period, a predetermined substitute image which had been stored in a predetermined memory and is an image unrelated to an image currently sensed by the image sensing unit, and
   inserting into the moving image data file in the second period an image corresponding to a still image sensed in response to the still image sensing instruction; and a recording unit that records, in the recording medium, the moving image data file into which is inserted the substitute image by said generation unit and a still image file generated in response to the inputting of the still image sensing instruction,
   wherein the image sensing apparatus further comprises an audio input unit,
   wherein the moving image sensing operation includes an operation for recording a moving image in the recording medium together with audio information obtained by said audio input unit,
   wherein said generation unit inserts pseudo shutter sound information in the first period, and
   wherein said generation unit inserts audio information input by said audio input unit in the second period.

2. The apparatus according to claim 1, wherein said audio input unit is stopped to be set in a silence detection state in a time period in which the pseudo shutter sound information is inserted in the first period.

3. The apparatus according to claim 1, wherein said generation unit inserts the sensed still image data by resizing the still image to an image of a resolution of the moving image in the second period.

4. The apparatus according to claim 1, wherein the first period is a fixed period.

5. The apparatus according to claim 4, wherein the first period includes at least an exposure period in which a shutter upon sensing a still image by the image sensing unit is open.

6. The apparatus according to claim 1, wherein the first period is set in correspondence with a time period in which a shutter is opened upon sensing a still image.

7. The apparatus according to claim 1, wherein the second period includes at least a time period in which image data for a still image is read out from the image sensing unit and development processing is completed.

8. The apparatus according to claim 1, further comprising:
   a display unit that displays a sensed image; and
   a unit that generates a review image to be displayed on said display unit based on image data obtained by the still image sensing operation, after the still image is sensed,
   wherein the review image is used as image data to be inserted in the second period.

9. The apparatus according to claim 1, wherein the substitute image to be inserted in the first period is a blackout image.

10. The apparatus according to claim 1, wherein a time period obtained by adding the first period and the second period is longer than a time period obtained by adding an exposure period required for the still image sensing operation, a data read period from the image sensing unit, and a development processing period.

11. A method of controlling an image sensing apparatus, which comprises an image sensing unit and an audio input unit and records image data sensed by the image sensing unit in a recording medium, comprising:
   an image sensing operation control step of controlling a moving image sensing operation for recording a moving image obtained by continuously sensing an image by the image sensing unit as a moving image data file in the recording medium, and a still image sensing operation for recording a still image sensed by the image sensing unit as a still image data file in the recording medium;
   a generation step of dividing, in a case where a still image sensing instruction is input during the moving image sensing operation, a time period for performing one still image sensing operation into a first period and a second period that follows the first period, and inserting a substitute image as a frame in the first and second periods into the moving image data file being generated in the moving image sensing operation,
   wherein the inserting operation includes steps of:
   inserting into the moving image data file in the first period, a predetermined substitute image which had been stored in a predetermined memory and is an image unrelated to an image currently sensed by the image sensing unit; and
   inserting into the moving image data file an image corresponding to a still image sensed in response to the still image sensing instruction in the second period; and
   a recording step of recording, in the recording medium, the moving image file into which is inserted the substitute image by said generation step and a still image file generated in response to the inputting of the still image sensing instruction,
   wherein the moving image sensing operation includes an operation for recording a moving image in the recording medium together with audio information obtained by said audio input unit,
   inserting pseudo shutter sound information in the first period, and
   inserting audio information input by said audio input unit in the second period.

12. An image sensing apparatus which comprises an image sensing unit and records image data sensed by the image sensing unit in a recording medium, comprising:
   a display unit that displays an image which is being sensed by the image sensing unit;
   an image sensing operation control unit that controls a moving image sensing operation for recording a moving image obtained by continuously sensing an image by the image sensing unit as a moving image data file in the recording medium, and a still image sensing operation for recording a still image sensed by the image sensing unit as a still image data file in the recording medium;

a display control unit that, in a case where a still image sensing instruction is input during the moving image sensing operation, in a time period T of the still image sensing operation, (a) displays a blackout image in a time period Ta1 from an input timing of the still image sensing instruction until development processing of image data obtained from the image sensing unit is completed, and (b) displays obtained still image data on said display unit in a time period Ta2 (Ta2=T−Ta1) from completion of the development processing until the moving image sensing operation restarts;

an insertion unit that, in a case where the still image sensing instruction is input during the moving image sensing operation, inserts substitute moving image data having the time period T into the moving image data file being generated in the moving image sensing operation by:

inserting predetermined substitute image data, which had been stored in the predetermined memory and represents an image unrelated to an image currently sensed by the image sensing unit, in the moving image file as moving image data in a time period Tb1 different from the time period Ta1; and inserting in the moving image file still image data as moving image data corresponding to a time period Tb2 (Tb2=T−Tb1) after the time period Tb1; and a recording unit that records, in the recording medium, the moving image file into which is inserted the substitute image data by said insertion unit and a still image file generated in response to the inputting of the still image sensing instruction, wherein the image sensing apparatus further comprises an audio input unit that inputs acoustic data, wherein the moving image sensing operation includes an operation for recording a moving image in the recording medium together with audio information obtained by said audio input unit, wherein said generation unit inserts pseudo shutter sound data as acoustic data corresponding to the substitute image data when the substitute image data is stored in the recording medium as a moving image, and wherein said generation unit inserts acoustic data input from said audio input unit in the time period after the exposure period until the moving image sensing operation restarts when the still image data is stored in the recording medium as a moving image.

13. The apparatus according to claim 12, wherein said audio input unit is stopped to be set in a silence detection state in a time period in which the pseudo shutter sound data is stored.

14. The apparatus according to claim 12, wherein said generation unit resizes the sensed still image data to an image of a resolution of a moving image for inserting the still image data into the moving image.

15. The apparatus according to claim 12, wherein the substitute image data represents a blackout image.

16. A method of controlling an image sensing apparatus, which comprises an image sensing unit and an audio input unit and a display unit that displays an image which is being sensed by the image sensing unit, and records image data sensed by the image sensing unit in a recording medium, comprising:

an image sensing operation control step of controlling a moving image sensing operation for recording a moving image obtained by continuously sensing an image by the image sensing unit as a moving image data file in the recording medium, and a still image sensing operation for recording a still image sensed by the image sensing unit as a still image data file in the recording medium;

a display control step of, in a case where a still image sensing instruction is input during the moving image sensing operation, in a time period T of the still image sensing operation, (a) displaying a blackout image in a time period Ta1 from an input timing of the still image sensing instruction until development processing of image data obtained from the image sensing unit is completed, and (b) displaying obtained still image data on said display unit in a time period Ta2 (Ta2=T−Ta1) from completion of the development processing until the moving image sensing operation restarts;

an insertion step that, in a case where the still image sensing instruction is input during the moving image sensing operation, inserts substitute moving image data having the time period T into the moving image data file being generated in the moving image sensing operation by:

inserting predetermined substitute image data which had been stored in the predetermined memory and represents an image unrelated to an image currently sensed by the image sensing unit, in the moving image file as moving image data in a time period Tb1 different from the time period Ta1; and inserting in the moving image file still image data as moving image data corresponding to a time period Tb2 (Tb2=T−Tb1) after the time period Tb1; and a recording unit that records, in the recording medium, the moving image file into which is inserted the substitute image data by said insertion step and a still image file generated in response to the inputting of the still image sensing instruction, wherein the moving image sensing operation includes an operation for recording a moving image in the recording medium together with audio information obtained by said audio input unit, inserting pseudo shutter sound information in the first period, and inserting audio information input by said audio input unit in the second period.

* * * * *